US011319446B2

(12) United States Patent
Johnson et al.

(10) Patent No.: US 11,319,446 B2
(45) Date of Patent: May 3, 2022

(54) MOISTURE CURABLE COMPOSITIONS

(71) Applicant: DOW SILICONES CORPORATION, Midland, MI (US)

(72) Inventors: William Johnson, Midland, MI (US); Christine Marchand, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 66 days.

(21) Appl. No.: 16/635,157

(22) PCT Filed: Jul. 30, 2018

(86) PCT No.: PCT/US2018/044372
§ 371 (c)(1),
(2) Date: Jan. 29, 2020

(87) PCT Pub. No.: WO2019/027897
PCT Pub. Date: Feb. 7, 2019

(65) Prior Publication Data
US 2021/0087396 A1    Mar. 25, 2021

Related U.S. Application Data

(60) Provisional application No. 62/538,847, filed on Jul. 31, 2017.

(51) Int. Cl.
| | |
|---|---|
| C08L 83/04 | (2006.01) |
| C08K 3/013 | (2018.01) |
| C08K 5/5445 | (2006.01) |
| C08G 77/08 | (2006.01) |
| C08G 77/16 | (2006.01) |
| C08K 3/26 | (2006.01) |
| C08K 3/36 | (2006.01) |
| C08K 5/5419 | (2006.01) |

(52) U.S. Cl.
CPC ............ *C08L 83/04* (2013.01); *C08G 77/08* (2013.01); *C08G 77/16* (2013.01); *C08K 3/013* (2018.01); *C08K 3/26* (2013.01); *C08K 3/36* (2013.01); *C08K 5/5419* (2013.01); *C08K 5/5445* (2021.01); *C08G 2150/00* (2013.01); *C08K 2003/265* (2013.01); *C08L 2312/08* (2013.01)

(58) Field of Classification Search
CPC ........ C08G 77/18; C08G 77/16; C08G 77/08; C08L 83/04; C08L 2312/08; C08K 5/5419
See application file for complete search history.

(56) References Cited

U.S. PATENT DOCUMENTS

| | | | |
|---|---|---|---|
| 5,013,807 A | 5/1991 | Shimizu et al. | |
| 5,338,574 A | 8/1994 | O'Neil et al. | |
| 5,492,939 A | 2/1996 | Stanga et al. | |
| 6,162,756 A | 12/2000 | Friebe et al. | |
| 6,204,339 B1 | 3/2001 | Waldman et al. | |
| 2007/0129528 A1 | 6/2007 | Huang et al. | |
| 2007/0244249 A1* | 10/2007 | Correia | C09K 3/1018 524/588 |
| 2008/0311419 A1 | 12/2008 | Ramdatt et al. | |
| 2010/0009979 A1 | 4/2010 | Wunder | |
| 2010/0317796 A1 | 12/2010 | Huang et al. | |
| 2011/0248314 A1 | 10/2011 | Takei et al. | |
| 2015/0240057 A1 | 8/2015 | Kumar et al. | |
| 2016/0340548 A1 | 11/2016 | Gubbels et al. | |
| 2017/0174840 A1 | 6/2017 | Dinkar | |
| 2018/0016400 A1 | 1/2018 | Gutaker et al. | |

FOREIGN PATENT DOCUMENTS

| | | |
|---|---|---|
| CN | 101864172 A | 10/2010 |
| CN | 101864173 A | 10/2010 |
| CN | 102268234 A | 12/2011 |
| CN | 102977840 A | 3/2013 |
| EP | 0802233 A2 | 10/1997 |
| EP | 2106418 A1 | 10/2009 |
| WO | 2005103117 A1 | 11/2005 |
| WO | 2013090127 A1 | 6/2013 |
| WO | 2013100175 A1 | 7/2013 |
| WO | 2013101751 A1 | 7/2013 |
| WO | 2014205251 A2 | 12/2014 |
| WO | 2015100198 A1 | 7/2015 |
| WO | 2016081790 A1 | 5/2016 |
| WO | 2016146648 A1 | 9/2016 |

OTHER PUBLICATIONS

International Search Report for PCT/CN2018/000275 dated Oct. 16, 2018, 4 pages.
International Search Report for PCT/CN2018/044372 dated Oct. 22, 2018, 4 pages.
International Search Report for PCT/CN2018/000276 dated Oct. 26, 2018, 4 pages.
Machine-assisted English translation of CN 101864172 obtained from https://worldwide.espacenet.com on Feb. 5, 2020, 14 pages.
Machine-assisted English translation of CN 101864173 obtained from https://worldwide.espacenet.com on Feb. 5, 2020, 14 pages.
Machine-assisted English translation of CN 102268234 obtained from https://worldwide.espacenet.com on Apr. 28, 2020, 18 pages.
Machine assisted English translation of CN102977840A obtained from https://patents.google.com/patent on Dec. 14, 2021, 9 pages.

* cited by examiner

*Primary Examiner* — Kuo Liang Peng
(74) *Attorney, Agent, or Firm* — Warner Norcross + Judd LLP

(57) ABSTRACT

A two-part moisture cure organosiloxane composition is disclosed. The two-part moisture cure organosiloxane composition comprises a base component and a catalyst package. The catalyst package undergoes minimal phase separation during storage.

14 Claims, No Drawings

MOISTURE CURABLE COMPOSITIONS

This application is the national stage of International Appl. No. PCT/US2018/044372 filed on 30 Jul. 2018, which claims priority to and all advantages of U.S. patent application Ser. No. 62/538,847 filed on 31 Jul. 2017, the content of which is hereby incorporated by reference.

This application claims priority to and all advantages of U.S. patent application Ser. No. 62/538,847 filed on 31 Jul. 2017, the content of which is hereby incorporated by reference.

This disclosure concerns a two-part (or two component) moisture cure organosiloxane composition comprising a base component (or base component composition) and a catalyst package (or catalyst package composition). The catalyst package undergoes minimal phase separation during storage.

Condensation curable organosiloxane compositions, which cure to elastomeric solids, are understood in the art. Typically, such compositions are obtained by mixing a polydiorganosiloxane having reactive terminal groups, e.g. hydroxy groups or hydrolysable groups, with e.g. a silane cross-linking agent which is reactive with the polydiorganosiloxane, for example an acetoxy silane, an oximosilane, an aminosilane or an alkoxysilane, in the presence of a suitable catalyst. The resulting compositions are curable upon exposure to atmospheric moisture at room temperature and may be used as structural sealants/adhesives.

In use as sealants, it is important that a composition is capable of curing in comparatively thick layers to provide an elastomeric body. It is frequently desirable that the organopolysiloxane composition cures quickly enough to provide a sound seal within several hours but not so quickly, that the surface cannot be tooled to desired configuration shortly after application. Dependent on the means of cure (e.g. cross-linker and catalyst) such compositions may be provided to the user in a one-part curable product, which can be applied onto a substrate directly or alternatively in a multi-part, typically two-part, combination requiring the multiple parts to be mixed together immediately before use.

The properties of individual parts of said multi-part compositions are generally not affected by atmospheric moisture, but once mixed together the resulting mixture possesses excellent deep curability and enables substantially uniform curing throughout the entire body of the sealing material, i.e., from the surface to the inner part. Typically such two component compositions comprise a first (base) component that contains silanol-terminated diorganopolysiloxane and a reinforcing filler, e.g. calcium carbonate, and a second component (catalyst or cure package) containing an alkyl-terminated diorganopolysiloxane, tin based catalyst, cross-linker and adhesion promoter, e.g. an aminosilane.

It is generally acknowledged that the cure speed of this type of two component composition, subsequent to mixing the two components together, can be easily accelerated by increasing either or both of the tin catalyst level and the adhesion promoter level. However, with the increase of adhesion promoter, especially in the case of primary amino silanes, the alkyl-terminated diorganopolysiloxane in the catalyst package undergoes random chain scission, which causes viscosity to decrease and making the mixture unstable. In addition, the ingredients in the catalyst package are not always miscible. This immiscibility may cause the alkyl-terminated diorganopolysiloxane to phase separate by rising to the top of the container, and as a result, the silanes and filler in the catalyst package settle to the bottom of the mixture. As a result of the above phase separation, the storage stability of the catalyst package may be dramatically impacted.

Phase separation is a significant issue for end users. It is extremely messy and time consuming to remix the catalyst package of such two-part compositions before use, after a storage period, especially on a large scale as some of the catalysts used can be flammable thereby causing a potential safety hazard. Furthermore, there is a tendency for carrier fluid e.g. unreactive silicones to accumulate in an upper phase at the top of the material, whilst filler is likely to settle in a silane rich lower phase, rendering re-mixing on a large scale, at least problematic but in extreme cases particularly on an industrial scale, when significant phase separation is evident, can lead to the catalyst package having to be replaced.

There is provided herein a two-part moisture curing silicone composition having a base component and catalyst package component. The catalyst package component comprises:
(i) a polydialkylsiloxane having the general formula:

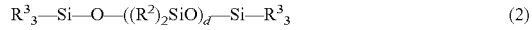

$$R^3{}_3-Si-O-((R^2)_2SiO)_d-Si-R^3{}_3 \qquad (2)$$

where each $R^2$ is an alkyl group or a phenyl group, each $R^3$ may be the same or different and is selected from $R^2$, alkyl, phenyl, alkenyl or alkynyl groups having a viscosity of from about 5 to about 100,000 mPa·s at 25° C., i.e. d is an integer which provides this viscosity range;
(ii) one or more dipodal silanes in accordance with the formula:

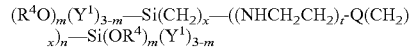

$$(R^4O)_m(Y^1)_{3-m}-Si(CH_2)_x-((NHCH_2CH_2)_t-Q(CH_2)_x)_n-Si(OR^4)_m(Y^1)_{3-m}$$

where each $R^4$ is a $C_{1-10}$ alkyl group, each $Y^1$ is an alkyl group containing from 1 to 8 carbons, Q is a chemical group containing a heteroatom with a lone pair of electrons, each x is an integer of from 1 to 6, t is 0 or 1, each m is independently 1, 2 or 3, and n is 0 or 1;
(iii) a cross-linker; and
(iv) a tin based catalyst.

Any suitable base component may be utilized. For example, the base component may comprise:
(a) a siloxane polymer having at least two terminal hydroxyl or hydrolysable groups having a viscosity of from about 1,500 to about 150,000 mPa·s at 25° C.;
(b) one or more reinforcing fillers; and optionally
(c) one or more non-reinforcing fillers.

Alternatively, there is provided herein a two-part moisture curing silicone composition having a base component and catalyst package component. The base component comprises:
(a) a siloxane polymer having at least two terminal hydroxyl or hydrolysable groups having a viscosity of from about 1,500 to about 150,000 mPa·s at 25° C.;
(b) one or more reinforcing fillers; and optionally
(c) one or more non-reinforcing fillers; and
the catalyst package comprising:
(i) a polydialkylsiloxane which is unreactive with polymer (a) of the base component, having the general formula:

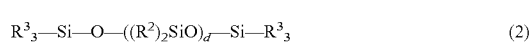

$$R^3{}_3-Si-O-((R^2)_2SiO)_d-Si-R^3{}_3 \qquad (2)$$

where each $R^2$ is an alkyl group or a phenyl group, each $R^3$ may be the same or different and is selected from $R^2$, alkyl, phenyl, alkenyl or alkynyl groups having a viscosity of from about 5 to about 100,000 mPa·s at 25° C., i.e. d is an integer which provides this viscosity range;

(ii) one or more dipodal silanes in accordance with the formula:

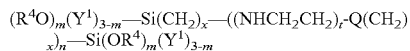

where each $R^4$ is a $C_{1-10}$ alkyl group, each $Y^1$ is an alkyl group containing from 1 to 8 carbons, Q is a chemical group containing a heteroatom with a lone pair of electrons, each x is an integer of from 1 to 6, t is 0 or 1, each m is independently 1, 2 or 3, and n is 0 or 1;
(iii) a cross-linker; and
(iv) a tin based catalyst.

Unless otherwise indicated all viscosity measurements were determined by using a Brookfield® cone plate viscometer (RV DIII) using cone plate CP-52 for viscosities of 40,000 mPa·s and below and cone plate CP-41 for materials having viscosities greater than 40,000 mPa·s adapting the speed according to the polymer viscosity and all viscosity measurements were taken at 25° C. unless otherwise indicated.

The base component may comprise (a) a siloxane polymer having at least two terminal hydroxyl or hydrolysable groups having a viscosity of from about 1,500 to about 150,000 mPa·s at 25° C., alternatively about 1,500 to about 100,000 mPa·s at 25° C., alternatively about 1,500 to about 80,000 mPa·s at 25° C. The siloxane polymer (a) may be described by the following molecular Formula (1)

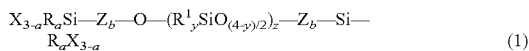

where a is 0, 1, 2 or 3, b is 0 or 1, z is an integer from 300 to 5000 inclusive, and y is 0, 1 or 2, alternatively 2.

At least 97% of the $R^1_y SiO_{(4-y)/2}$ are characterized with y=2. X is a hydroxyl group or any condensable or any hydrolyzable group. Each Z is independently selected from an alkylene group having from 1 to 10 carbon atoms.

Each R is individually selected from aliphatic organic groups selected from alkyl, aminoalkyl, polyaminoalkyl, epoxyalkyl or alkenyl groups, alternatively from alkyl, aminoalkyl, polyaminoalkyl, or epoxyalkyl groups having, in each case, from 1 to 10 carbon atoms per group or alkenyl groups having in each case from 2 to 10 carbon atoms per group or is an aromatic aryl group, alternatively an aromatic aryl group having from 6 to 20 carbon atoms. In certain embodiments, each R is individually selected from methyl, ethyl, octyl, vinyl, allyl and phenyl groups.

Each $R^1$ is individually selected from the group consisting of X; alkyl groups, alternatively alkyl groups having from 1 to 10 carbon atoms; alkenyl groups, alternatively alkenyl groups having from 2 to 10 carbon atoms; and aromatic groups, alternatively aromatic groups having from 6 to 20 carbon atoms. In certain embodiments, each $R^1$ is individually selected from methyl, ethyl, octyl, trifluoropropyl, vinyl and phenyl groups. It is possible that some $R^1$ groups may be siloxane branches off the polymer backbone which may have terminal groups as hereinbefore described. In specific embodiments, each $R^1$ is a methyl group.

Each X group of siloxane polymer (a) may be the same or different and can be a hydroxyl group or a condensable or hydrolyzable group. The term "hydrolyzable group" means any group attached to the silicon, which is hydrolyzed by water at room temperature. The hydrolyzable group X includes groups of the Formula —OT, where T is an alkyl group such as methyl, ethyl, isopropyl, or octadecyl; an alkenyl group such as allyl, hexenyl; a cyclic group such as cyclohexyl, phenyl, benzyl, or beta-phenylethyl; a hydrocarbon ether group, such as 2-methoxyethyl, 2-ethoxyisopropyl, 2-butoxyisobutyl, p-methoxyphenyl or —(CH$_2$CH$_2$O)$_2$CH$_3$; or any N,N-amino radical, such as dimethylamino, diethylamino, ethylmethylamino, diphenylamino, or dicyclohexylamino.

In certain embodiments, each X group is selected from hydroxyl or alkoxy groups. Illustrative alkoxy groups are methoxy, ethoxy, propoxy, isopropoxy, butoxy, isobutoxy, pentoxy, hexoxy octadecyloxy and 2-ethylhexoxy; and dialkoxy radicals, such as methoxymethoxy or ethoxymethoxy and alkoxyaryloxy, such as ethoxyphenoxy. In specific embodiments, each X group is selected from methoxy or ethoxy groups.

Each Z is independently selected from an alkylene group having from 1 to 10 carbon atoms. In one alternative, each Z is independently selected from an alkylene group having from 2 to 6 carbon atoms; in a further alternative each Z is independently selected from an alkylene group having from 2 to 4 carbon atoms.

Siloxane polymer (a) of the base component can be a single siloxane represented by Formula (1) or it can be mixtures of siloxanes represented by the aforesaid formula. The term "siloxane polymer mixture" in respect to component (a) of the base component is meant to include any individual siloxane polymer (a) or mixtures of siloxane polymers (a). As used herein, the term "silicone content" means the total amount of silicone used in the base component and the catalyst package, irrespective of the source, including, but not limited to the siloxane polymer (a), polymer mixtures, and/or resins.

The Degree of Polymerization (DP), (i.e. in the above formula substantially subscript z), is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) with precision of about 10-15%. This technique is standard and yields Mw, Mn and polydispersity index (PI). The degree of polymerization (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity. In various embodiments, siloxane polymer (a) is present in an amount of from about 20 to about 80, alternatively about 35 to about 65, % by weight of the base component.

The base component reinforcing filler (b) may contain one or more finely divided, reinforcing fillers such as precipitated calcium carbonate, high surface area fumed silica and/or high surface area precipitated silica including, for example, rice hull ash. Typically, the surface area of the reinforcing filler (b) is at least 50 m$^2$/g. In the case of high surface area fumed silica and/or high surface area precipitated silica, these may have surface areas of, for example, from 100 to 400 m$^2$/g, alternatively of from 100 to 300 m$^2$/g, measured in in accordance with the BET method. In various embodiments, the reinforcing fillers are present in an amount of from about 20 to about 70, alternatively about 35 to about 65, % by weight of the base component.

The optional non-reinforcing filler (c) of the base component may comprise non-reinforcing fillers such as ground calcium carbonate, crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Aluminum oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$ The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[SiO_4{}_{10}](OH)_8$; and vermiculite. In various embodiments where the optional non-reinforcing filler is utilized, the non-reinforcing filler is present in an amount up to 20% by weight of the base component.

In addition, a surface treatment of the reinforcing filler (b) of the base component and optional non-reinforcing filler (c) of the base component may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components The surface treatment of the fillers makes them easily wetted by siloxane polymer (a) of the base component. These surface modified fillers do not clump, and can be homogeneously incorporated into the silicone polymer (i) of the base component. This results in improved room temperature mechanical properties of the uncured compositions. The fillers may be pre-treated or may be treated in situ when being mixed with polymer (a).

Catalyst Package

It has been found that the catalyst package herein has minimal and often no phase separation during storage.

As hereinbefore described the catalyst package of the two-part composition comprises polydialkylsiloxane (i) which is unreactive with any reactive polymer in the base component (i.e. polymer (a) above). Polydialkylsiloxane (i) may have the general formula

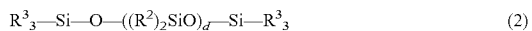

where each $R^2$ may be the same or different and is an alkyl group or a phenyl group, alternatively a $C_{1-10}$ alkyl group, alternatively a $C_{1-6}$ alkyl group, alternatively a methyl or ethyl group; each $R^3$ may be the same or different and is selected from $R^2$ above or an alkenyl or alkynyl group. Typically, polydialkylsiloxane (i) has a viscosity of from about 5 to about 100,000 mPa·s at 25° C., with d being an integer resulting in a polydialkylsiloxane within the specified viscosity range. Typically these are polydimethylsiloxanes which are unreactive with the siloxane polymer of the composition, such as polydimethylsiloxane in which each $R^2$ is a methyl group and each $R^3$ is, for example, methyl, vinyl or phenyl or combinations of these $R^3$ groups. Typically, polydialkylsiloxane (i) is linear but it may contain a degree of branching. Polydialkylsiloxane (i), which is unreactive with polymer (a), is typically present in the catalyst package as a carrier. In various embodiments, polydialkylsiloxane (i) is present in an amount of from about 30 to about 80, alternatively about 40 to about 65, weight % of the catalyst package.

The catalyst package of the two-part composition also contains one or more dipodal silanes (ii). The dipodal silanes of the catalyst package can be defined by the following formula:

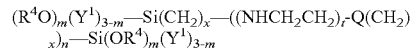

where each $R^4$ is a $C_{1-10}$ alkyl group, each $Y^1$ is an alkyl group containing from 1 to 8 carbons, Q is a chemical group containing a heteroatom with a lone pair of electrons, alternatively an amine or a urea; each x is an integer of from 1 to 6, t is 0 or 1, each m is independently 1, 2 or 3, alternatively 2 or 3, in a further alternative m is 3, and n is 0 or 1, alternatively 1.

In one alternative the catalyst package can be defined by the following formula:

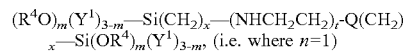

In one alternative Q is a secondary amine and each x is from 2 to 4.

Examples of dipodal silane (ii) include:
bis (trimethoxysilyl)hexane, 1,2-bis (triethoxysilyl)ethane, 1,2-bis (trimethoxysilyl)ethane,
bis (trialkoxysilylalkyl)amines, bis (dialkoxyalkylsilylalkyl) amine,
bis (trialkoxysilylalkyl) N-alkylamine, bis (dialkoxyalkylsilylalkyl) N-alkylamine,
bis (trialkoxysilylalkyl)urea, and/or bis (dialkoxyalkylsilylalkyl)urea.

Specific suitable examples of dipodal silane (ii) include:
bis (3-trimethoxysilylpropyl)amine, bis (3-triethoxysilylpropyl)amine,
bis (4-trimethoxysilylbutyl)amine, bis (4-triethoxysilylbutyl)amine,
bis (3-trimethoxysilylpropyl) N-methylamine, bis (3-triethoxysilylpropyl) N-methylamine,
bis (4-trimethoxysilylbutyl) N-methylamine, bis (4-triethoxysilylbutyl) N-methylamine,
bis (3-trimethoxysilylpropyl)urea, bis (3-triethoxysilylpropyl)urea,
bis (4-trimethoxysilylbutyl)urea, bis (4-triethoxysilylbutyl) urea,
bis (3-dimethoxymethylsilylpropyl)amine, bis (3-diethoxymethylsilylpropyl)amine,
bis (4-dimethoxymethylsilylbutyl)amine, bis (4-diethoxymethylsilylbutyl)amine,
bis (3-dimethoxymethylsilylpropyl) N-methylamine,
bis (3-diethoxymethyl silylpropyl) N-methylamine,
bis (4-dimethoxymethylsilylbutyl) N-methylamine,
bis (4-diethoxymethyl silylbutyl) N-methylamine, bis (3-dimethoxymethylsilylpropyl)urea,
bis (3-dimethoxymethyl silylpropyl)urea, bis (4-dimethoxymethylsilylbutyl)urea,
bis (4-diethoxymethyl silylbutyl)urea, bis (3-dimethoxyethylsilylpropyl)amine, bis (3-diethoxyethyl silylpropyl)amine, bis (4-dimethoxyethylsilylbutyl)amine,
bis (4-diethoxyethyl silylbutyl)amine, bis (3-dimethoxyethylsilylpropyl) N-methylamine,
bis (3-diethoxyethyl silylpropyl) N-methylamine,
bis (4-dimethoxyethylsilylbutyl) N-methylamine,
bis (4-diethoxyethyl silylbutyl) N-methylamine, bis (3-dimethoxyethylsilylpropyl)urea
bis (3-diethoxyethyl silylpropyl)urea, bis (4-dimethoxyethylsilylbutyl)urea, and/or
bis (4-diethoxyethyl silylbutyl)urea.

In a still further alternative the dipodal silanes (ii) are of the formula:

$(R^4O)_3-Si(CH_2)_x-(NHCH_2CH_2)_r-NH(CH_2)_x-Si(OR^4)_3$,

In which case the dipodal silane may be selected from a bis (trialkoxysilylalkyl)amine such as bis (3-tripropyloxysilylpropyl)amine, bis (3-methyldiethoxysilypropyl)amine, bis (3-methyldimethoxysilypropyl)amine, as well as bis (3-triethoxysilylpropyl)amine

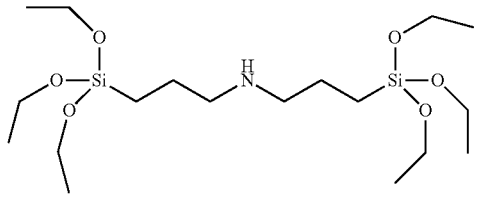 [SMILES: CCO[Si](CCCNCCC[Si](OCC)(OCC)OCC)(OCC)OCC]

or bis (3-trimethoxysilylpropyl)amine

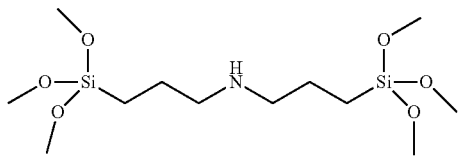

Alternatively the dipodal silane (ii) may be a bis (trialkoxysilylalkyl) alkylenediamine such as N,N'-bis [(3-trimethoxysilyl)propyl]ethylenediamine

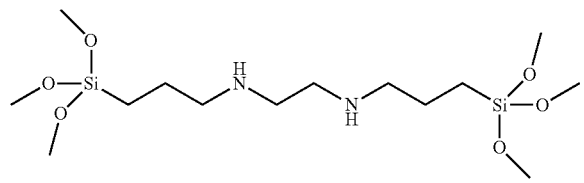

The dipodal silane (ii) is compatible with the polydialkylsiloxane (i) in the catalyst package.

Two-part compositions of the type herein provide a fast deep cure and as such adhesion promoters are an essential ingredient in such compositions to ensure speed of cure and, of course, adhesion to the substrate surface to which the composition is to be applied. It has been identified that not only do the above function well as adhesion promoters but they also seem to be more compatible with the other ingredients of the catalyst package thereby being an integral reason for the avoidance of phase separation previously seen in such compositions when solely using other amino-functional adhesion promoters, e.g. non-dipodal amine functional adhesion promoters. In various embodiments, the dipodal silanes (ii) are present in an amount of from about 5 to about 50, alternatively about 10 to about 30, weight % of the catalyst package.

Any suitable cross-linker may be used as cross-linker (iii) of the catalyst package. The crosslinker (iii) in the curable composition as hereinbefore described may be one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, iso-butoxy and propoxy); and alkenyloxy groups (for example isopropenyloxy and 1-ethyl-2-methylvinyloxy).

In the case of siloxane based cross-linkers the molecular structure can be straight chained, branched, or cyclic.

Cross-linker (iii) of the catalyst package preferably has at least three or four silicon-bonded condensable (preferably hydroxyl and/or hydrolysable) groups per molecule which are reactive with the condensable groups in organopolysiloxane polymer (a). When cross-linker is a silane and when the silane has three silicon-bonded hydrolysable groups per molecule, the fourth group is suitably a non-hydrolysable silicon-bonded organic group. These silicon-bonded organic groups are suitably hydrocarbyl groups, which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably, however, the fourth silicon-bonded organic groups is methyl.

Silanes and siloxanes which can be used as cross-linker (iii) of the catalyst package include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, tetraethylorthosilicate, tetrapropylorthosilicate, tetraamylorthosilicate, and dimethyltetraacetoxydisiloxane.

The cross-linker used as cross-linker (iii) of the catalyst package may also comprise any combination of two or more of the above. The amount of crosslinker present in the total composition (i.e. the total composition when the base component and the catalyst package are mixed together) will depend upon the particular nature of the crosslinker and in particular, the molecular weight of the molecule selected. The compositions suitably contain crosslinker in at least a stoichiometric amount as compared to the siloxane polymer (a) described above. In various embodiments, cross-linker (iii) is present in an amount of from about 1 to about 30, alternatively about 5 to about 25, weight % of the catalyst package.

The fourth essential ingredient in the catalyst package is a suitable tin based condensation catalyst (iv) which is for use as the catalyst for the cure reaction subsequent to mixing the base component and catalyst package component together. Examples include tin triflates, organic tin metal catalysts such as triethyltin tartrate, tin octoate, tin oleate, tin naphthate, butyltintri-2-ethylhexoate, tin butyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bis-neodecanoate, dibutyltin dibenzoate, stannous octoate, dimethyltin dineodecanoate (DMTDN) and dibutyltin dioctoate. In various embodiments, the tin catalyst is present in an amount of from about 0.01 to about 3, alternatively about 0.1 to about 0.5, weight % of the catalyst package.

Optionally, the catalyst package may also include one or more of, pigments (v) and/or fillers (vi).

Pigments

Pigments are utilized to color the composition as required. Any suitable pigment may be utilized providing it is compatible with the composition. In two-part compositions pigments and/or colored (non-white) fillers, e.g. carbon black may be utilized in the catalyst package to color the end sealant product. When present carbon black will function as both filler and colorant.

Fillers

One of the fillers used in the base component may also be used in the catalyst package if/when deemed appropriate. Silica, e.g. fumed silica and/or calcium carbonate being preferred. Fillers may be present in the catalyst package in an amount of from 0 to about 50 weight % depending on the mixing ratio of the two parts of the composition.

Other additives may be used if necessary. These may include non-dipodal adhesion promoters, heat stabilizers, flame retardants, UV stabilizers, cure modifiers, electrically conductive fillers, heat conductive fillers, and fungicides and/or biocides and the like.

Rheology Modifiers

Rheology modifiers which may be incorporated in moisture curable compositions according to the invention include silicone organic co-polymers such as those described in EP0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion of the sealant to substrates, particularly plastic substrates.

Non-Dipodal Adhesion Promoters

Examples of non-dipodal adhesion promoters which may be incorporated in moisture curable compositions according to the invention include alkoxysilanes such as (ethylenediaminepropyl)trimethoxy silane, aminoalkylalkoxysilanes, for example gamma-aminopropyltriethoxysilane or gamma-aminopropyltrimethoxysilane, epoxyalkylalkoxysilanes, for example, 3-glycidoxypropyltrimethoxysilane and glycidoxypropyltriethoxysilane, mercapto-alkylalkoxysilanes, and reaction products of ethylenediamine with silylacrylates. Isocyanurates containing silicon groups such as 1,3,5-tris(trialkoxysilylalkyl) isocyanurates may additionally be used. Further suitable adhesion promoters are reaction products of epoxyalkylalkoxysilanes such as 3-glycidoxypropyltrimethoxysilane with amino-substituted alkoxysilanes such as 3-aminopropyltrimethoxysilane and optionally with alkylalkoxysilanes such as methyltrimethoxysilane. Typically these may be used in small amounts e.g. up to 10% by weight of the catalyst package to enhance adhesion but, as previously indicated, their at least partial replacement is advantageous not only for the phase separation problems historically encountered in these compositions but also as high loadings of primary amine based adhesion promoters species can cause catalyst instability due to random chain scission of e.g. the unreactive silicones used in the catalyst package.

Biocides

Biocides may additionally be utilized in the composition if required. It is intended that the term "biocides" includes bactericides, fungicides and algicides, and the like. Suitable examples of useful biocides, which may be utilized in compositions as described herein, include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl] methyl]-1H-1,2,4-triazole.

The fungicide and/or biocide may suitably be present in an amount of from 0 to about 0.3% by weight of the composition and may be present in an encapsulated form where required such as described in EP2106418.

When mixed together, the total composition of the base component and the catalyst package comprises approximately:

18 to 72 weight % of siloxane polymer (a);
18 to 63 weight % reinforcing fillers (b);
0 to 18 weight % of non-reinforcing fillers (c);
0 to 4.5 weight % low viscosity polymer (d);
3 to 8 weight % of polydialkylsiloxane (i), which is unreactive with polymer (a);
0.5 to 5 weight % of dipodal silanes (ii);
0 to 3 weight % of cross-linker (iii); and
0 to 0.3 weight % of tin based catalyst (iv);
with the total weight % of the combined composition being 100 weight %.

In the case of two-part compositions, the base component comprises:

20 to 80 weight % of siloxane polymer (a);
20 to 70 weight % reinforcing fillers (b); and
0 to 20 weight % of non-reinforcing fillers (c);
with the total weight % of the base component being 100 weight %.

The catalyst package comprises:

30 to 80 weight % of polydialkylsiloxane (i), which is unreactive with polymer (a), alternatively
40 to 65 weight % of polydialkylsiloxane (i), which is unreactive with polymer (a);
5 to 50 weight % of dipodal silanes (ii), alternatively 15 to 30 weight % of dipodal silanes (ii);
1 to 30 weight % of cross-linker (iii), alternatively 2 to 20 weight % of cross-linker (iii); and 0 to 3 weight % of tin based catalyst; alternatively 0.1 to 3 weight % of tin based catalyst, alternatively 0.1 to 0.5 weight % of tin based catalyst;

0 to 30 weight % colored filler (e.g. carbon black) or pigment, alternatively 1 to 20 weight % colored filler when present;

0 to 20 weight % reinforcing filler, alternatively 1 to 10 weight % reinforcing filler;

with the total weight % of the catalyst package being 100 weight %.

In the case of two-part sealant compositions, the components of each part are mixed together in amounts within the ranges given above and then the base component and the catalyst package are inter-mixed in a predetermined ratio e.g. from 15:1 to 1:1, alternatively from 15:1 to 5:1; when the two parts are mixed together. If the intended mixing ratio of the base component:catalyst package is 15:1 or greater then no filler will be generally utilized in the catalyst package. However if the intended mixing ratio of the base component:catalyst package is less than 15:1 an increasing amount filler will be utilized in the catalyst package up to the maximum of 50 weight % of the catalyst package, if the intended ratio is 1:1. The moisture curable compositions can be prepared by mixing the ingredients employing any suitable mixing equipment.

Resulting compositions may be employed in a variety of applications, for example as coating, caulking, mold making and encapsulating materials for use with substrates such as glass, aluminium, stainless steel, painted metals, powder-coated metals, and the like. In particular, they are for use in construction and/or structural glazing and/or insulating glazing applications. For example, an insulating glass unit and/or building façade element e.g. a shadow box and/or structural glazing unit and/or a gas filled insulation construction panel, which in each case is sealed with a silicone sealant composition as hereinbefore described. Other potential applications include solar, automotive, electronics and industrial assembly and maintenance applications.

The following examples are provided to show that that catalyst package as provided herein can be stored/aged for an extended period of time with minimal phase separation.

All viscosities mentioned were measured using a Brookfield® cone plate viscometer (RV DIII) using cone plate CP-52 for viscosities of 40,000 mPa·s and below and cone plate CP-41 for materials having viscosities greater than 40,000 mPa·s adapting the speed according to the polymer viscosity. All amounts are in weight percent (wt. %) unless otherwise stated.

EXAMPLE 1

Comparison of Phase separation in the catalyst package of two-part compositions as hereinbefore described using a dipodal silane adhesion promoter (Example 1) and a comparative commercial catalyst package Dow Corning® 983 SGS Curing Agent using standard (prior art) adhesion promoter (Comp. 1).

TABLE 1a

|  | Example 1 (wt. %) |
| --- | --- |
| Trialkyl-terminated diorganopolysiloxane 60,000 mPa · s at 25° C. | 46.9 |
| Carbon black | 16.75 |
| Fumed silica | 3.35 |
| bis (3-triethoxysilylpropyl)amine | 16.401 |

TABLE 1a-continued

|  | Example 1 (wt. %) |
| --- | --- |
| tetraethyl orthosilicate | 16.401 |
| DMTDN (catalyst) | 0.198 |

Example 1 was prepared in a 10 liter Turello mixer. Using the following process:

Step (i): the alkyl-terminated diorganopolysiloxane 60,000 mPa·s at 25° C. was first introduced into the mixer.

Step (ii): Carbon black was added and mixed into the alkyl-terminated diorganopolysiloxane for several minutes.

Step (iii): the silica was then added and mixed into the product of step (ii).

Step (iv): the product of step (iii) was then mixed for a further 10 minutes at a speed of 2000 rpm with a full vacuum applied.

Step (v): the composition of step (iv) was then cooled to room temperature before the respective silanes and catalyst were introduced and mixed into the product of step (iv).

Example 1 was found to work well in respect to effecting the cure of a two-part composition once mixed with a base component. The base component used with both the Example 1 and Comp. 1 to make the cured product for testing physical properties was a commercial base component from Dow Corning (Dow Corning® 983 Silicone Glazing and Curtainwall Base).

The base component and respective catalyst packages were mixed using a Plas-Pak pneumatic gun, and Ratio-Pak® 8:1 cartridges. After loading a cartridge onto the gun, the caps were removed, and the plungers were advanced so that both curing agent and base were flowing from the nozzle. A 36-element static mixer was attached, and material was extruded until no streaks were observed in the mixed material. Once a uniform mix was achieved, test samples were prepared. All material was extruded at approximately 97 psi (668.8 kPa).

The resulting Example 1 catalyst package was then placed in a 5 gallon pail and allowed to age for a period of 1 year at room temperature. Likewise an off the shelf sample of Comp. 1 was aged in the same manner. After one year room temperature storage in a 5 gallon pail, Example 1 exhibited separation of <2 mm. After two months of room temperature storage, Comp.1 exhibited up to 40 mm of phase separation. These values were measured by ruler.

EXAMPLE 2

A variety of catalyst package samples as hereinbefore described were prepared in accordance with the process in Example 1 above. The compositions utilized for the catalyst package were as defined in Table 2a below:

TABLE 2a

|  | Sample 1 | Sample 2 | Sample 3 | Sample 4 |
| --- | --- | --- | --- | --- |
| Trialkyl-terminated diorganopolysiloxane 60,000 mPa · s at 25° C. | 53.60 | 53.60 | 50.25 | 46.90 |
| Carbon Black | 9.38 | 9.38 | 13.07 | 16.75 |
| Fumed Silica | 4.02 | 4.02 | 3.69 | 3.35 |
| bis (3-triethoxy-silylpropyl)amine | 16.40 | 16.40 | 12.19 | 12.19 |
| Tetraethyl | 16.40 | 16.40 | 20.61 | 20.61 |

TABLE 2a-continued

|  | Sample 1 | Sample 2 | Sample 3 | Sample 4 |
|---|---|---|---|---|
| orthosilicate (TEOS) | | | | |
| Dimethyltin dineodecanoate (DMTDN) | 0.20 | 0.20 | 0.20 | 0.20 |

The different samples were then aged using a QUV Accelerated Weathering Tester Model QUV/se for set durations as indicated in Table 2b below. The QUV aging was a cycle of eight hours UVA at 0.89 irradiance and 60° C., followed by four hours of condensation at 50° C. A second commercial catalyst package Dow Corning® 982 Curing Agent (Comp. 2) was also aged as a further comparison.

These catalyst packages were again inter-mixed with Dow Corning® 983 Silicone Glazing and Curtainwall Base after aging in the manner described in respect to Example 1 and physical properties of the resulting cured materials were determined. Tensile strength and elongation were tested according to ASTM D412-98A(2002) e1 test method A. A 100 mil (2.54 mm) slab of material was drawn down on polyethylene terephthalate (PET) and cured seven days at room temperature and 50% relative humidity (RH). Post cure conditions are as reported. Dogbones were cut using die DIN S2, and pulled on an MTS Alliance R/5 at 20.0 in/min (0.01 ms$^{-1}$) using a 5 kN load cell. Data was collected and analyzed using Test Works Elite v. 2.3.6.

Durometer was measured on a Shore® Conveloader CV-71200 type A. Samples were stacked ½" (1.27 mm) thick, and values reported are an average of three.

TABLE 2b

Shore Durometer A

|  | Durometer Shore A (7 Days) | Durometer Shore A (10,000 hours QUV) |
|---|---|---|
| Sample 1 | 37 | 35 |
| Sample 2 | 39 | 38 |
| Sample 3 | 38 | 34 |
| Sample 4 | 41 | 36 |
| Comp. 2 | 37 | 42 |
| Comp. 1 | 39 | 29 |

The durometer of the dipodal samples (1-4) remained stable after the QUV aging. We would expect to see a slightly lower durometer after this aging test. Comp. 2 (Dow Corning® 982 Silicone Insulating Glass Sealant), actually increases in durometer which can be problematic in field application where some amount of movement is desirable. Dow Corning® 983 SGS Curing Agent (Comp. 1) degrades much more in durometer than the dipodal examples and appears to be less hydrolytically stable.

TABLE 2c

Tensile Strength

|  | Tensile Strength (PSI) (7 days) | Tensile Strength (PSI) (10,000 hours QUV) |
|---|---|---|
| Sample 1 | 354.5 | 290.7 |
| Sample 2 | 330.3 | 297.3 |
| Sample 3 | 348.6 | 292.4 |
| Sample 4 | 311 | 233.5 |
| Comp. 2 | 282.2 | 143.8 |
| Comp. 1 | 301.1 | 193.5 |

The dipodal examples maintained higher tensile strength after QUV aging, indicating that they are more hydrolytically stable than both comp. 1 and Comp. 2.

TABLE 2d

Elongation

|  | Elongation (%) (7 days) | Elongation (%) (10,000 hours QUV) |
|---|---|---|
| Sample 1 | 440.206 | 353.932 |
| Sample 2 | 355.63 | 381.351 |
| Sample 3 | 389.814 | 449.018 |
| Sample 4 | 276.907 | 321.498 |
| Comp. 2 | 311.655 | 168.159 |
| Comp. 1 | 383.428 | 407.317 |

TABLE 2e

50% modulus

|  | 50% modulus (7 days) | 50% modulus (10,000 hours QUV) |
|---|---|---|
| Sample 1 | 66.34 | 65.272 |
| Sample 2 | 70.957 | 66.563 |
| Sample 3 | 69.562 | 59.729 |
| Sample 4 | 84.738 | 64.938 |
| Comp. 2 | 63.585 | 74.609 |
| Comp. 1 | 71.696 | 51.373 |

The modulus of the dipodal examples (1-4) remained stable after the QUV aging. We would expect to see a slightly lower modulus after this aging test. Comp 2 actually increases in modulus, which can be problematic in field application where some amount of movement is desirable. Comp. 1 degrades slightly more in modulus than the dipodal examples and appears to be less hydrolytically stable.

TABLE 2f

100% modulus

|  | 100% modulus (7 days) | 100% modulus (10,000 hours QUV) |
|---|---|---|
| Sample 1 | 107.832 | 105.304 |
| Sample 2 | 117.521 | 104.811 |
| Sample 3 | 115.762 | 92.207 |
| Sample 4 | 138.408 | 102.467 |
| Comp. 2 | 108.645 | 112.185 |
| Comp. 1 | 112.702 | 75.724 |

QUV durability of the examples is on par with Comp.1 and does not degrade significantly nor increase in modulus, which is a drawback of Comp. 2.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values.

Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A two-part moisture curing composition having:
   a base component; and
   a catalyst package component;
   wherein the catalyst package component comprises:
   (i) 40 to 65 wt. % of a polydialkylsiloxane having the general formula:

$R^3_3Si-O-((R^2)_2SiO)_d-SiR^3_3$, where each $R^2$ is an alkyl group or a phenyl group, each $R^3$ is individually selected from $R^2$, alkyl, phenyl, alkenyl or alkynyl groups, and d is an integer such that the polydialkylsiloxane (i) has a viscosity of from about 5 to about 100,000 mPa·s at 25° C.;
   (ii) 15 to 30 wt. % of at least one dipodal silane in accordance with the general formula:

$(R^4O)_m(Y^1)_{3-m}Si-(CH_2)_x-((NHCH_2CH_2)_t-Q(CH_2)_x)_n-Si(OR^4)_m(Y^1)_{3-m}$, where each $R^4$ is independently a $C_{1-10}$ alkyl group, each $Y^1$ is independently a $C_{1-8}$ alkyl group, Q is a heteroatom containing moiety with a lone pair of electrons, each x is independently an integer of from 1 to 6, t is 0 or 1, each m is independently 1, 2 or 3, and n is 0 or 1;
   (iii) 2 to 20 wt. % of a cross-linker; and
   (iv) 0.01 to 3 wt. % of a tin based catalyst;
   each based on the total weight of the catalyst package; and
   wherein the base component comprises:
   (a) 20 to 80 wt. % of a siloxane polymer having at least two terminal hydroxyl or hydrolysable groups and a viscosity of from about 1,500 to about 150,000 mPa·s at 25° C.;
   (b) 20 to 70 wt. % of at least one reinforcing filler; and
   (c) 0 to 20 wt. % of at least one non-reinforcing filler;
   each based on the total weight of the base component.

2. The two-part moisture curing composition in accordance with claim 1, wherein the dipodal silane (ii) is selected from the group consisting of
bis (trimethoxysilyl)hexane, 1,2-bis (triethoxysilyl)ethane,
bis (alkoxysilylalkyl)amines,
bis (dialkoxyalkylsilylalkyl)amines, bis (trialkoxysilylalkyl) N-alkylamines,
bis (dialkoxyalkylsilylalkyl)N-alkylamines, bis (trialkoxysilylalkyl)ureas,
bis (dialkoxyalkylsilylalkyl)ureas, and combinations thereof.

3. The two-part moisture curing composition in accordance with claim 1, wherein the dipodal silane (ii) is selected from the group consisting of
bis (3-trimethoxysilylpropyl)amine, bis (3-triethoxysilylpropyl)amine,
bis (4-trimethoxysilylbutyl)amine, bis (4-triethoxysilylbutyl)amine,
bis (3-trimethoxysilylpropyl)N-methylamine, bis (3-triethoxysilylpropyl)N-methylamine,
bis (4-trimethoxysilylbutyl)N-methylamine, bis (4-triethoxysilylbutyl)N-methylamine,
bis (3-trimethoxysilylpropyl)urea, bis (3-triethoxysilylpropyl)urea,
bis (4-trimethoxysilylbutyl)urea, bis (4-triethoxysilylbutyl)urea, bis (3-dimethoxymethylsilylpropyl)amine, bis (3-diethoxymethyl silylpropyl)amine,
bis (4-dimethoxymethylsilylbutyl)amine, bis (4-diethoxymethyl silylbutyl)amine,
bis (3-dimethoxymethylsilylpropyl)N-methylamine,
bis (3-diethoxymethyl silylpropyl)N-methylamine,
bis (4-dimethoxymethylsilylbutyl)N-methylamine,
bis (4-diethoxymethyl silylbutyl)N-methylamine,
bis (3-dimethoxymethylsilylpropyl)urea, bis (3-diethoxymethyl silylpropyl)urea,
bis (4-dimethoxymethylsilylbutyl)urea,
bis (4-diethoxymethyl silylbutyl)urea, bis (3-dimethoxyethylsilylpropyl)amine,
bis (3-diethoxyethyl silylpropyl)amine, bis (4-dimethoxyethylsilylbutyl)amine,
bis (4-diethoxyethyl silylbutyl)amine, bis (3-dimethoxyethylsilylpropyl)N-methylamine,
bis (3-diethoxyethyl silylpropyl)N-methylamine,
bis (4-dimethoxyethylsilylbutyl)N-methylamine,
bis (4-diethoxyethyl silylbutyl)N-methylamine, bis (3-dimethoxyethylsilylpropyl)urea,
bis (3-diethoxyethyl silylpropyl)urea, bis (4-dimethoxyethylsilylbutyl)urea,
bis (4-diethoxyethyl silylbutyl)urea, and combinations thereof.

4. The two-part moisture curing composition in accordance with claim 1, wherein the dipodal silane (ii) has the general formula:

$(R^4O)_3Si-(CH_2)_x-(NHCH_2CH_2)_t-NH(CH_2)_x-Si(OR^4)_3$, where each of $R^4$, x, and t is as defined above.

5. The two-part moisture curing composition in accordance with claim 3, wherein the dipodal silane (ii) is selected from the group consisting of
bis (3-tripropyloxysilypropyl)amine, bis (3-methyldiethoxysilypropyl)amine,
bis (3-methyldimethoxysilypropyl)amine, bis (3-triethoxysilylpropyl)amine,
bis (3-trimethoxysilylpropyl)amine, N,N'-bis [(3-trimethoxysilyl)propyl]ethylenediamine, and combinations thereof.

6. The two-part moisture curing composition in accordance with claim 1, wherein ingredients (i), (ii), (iii), and (iv) of the catalyst package component are substantially or completely miscible.

7. The two-part moisture curing composition in accordance with claim 1, wherein the siloxane polymer (a) is present in the composition in an amount of from about 10 to about 70 weight % based on the total weight of the base component.

8. The two-part moisture curing composition in accordance with claim 1, wherein the reinforcing filler (b) is selected from the group consisting of fumed silicas, precipitated silicas, precipitated calcium carbonate, and combinations thereof.

9. The two-part moisture curing composition in accordance with claim 1, wherein the weight ratio of the base component to the catalyst package component, when mixed, is between about 15:1 and about 1:1.

10. A one-part moisture curing composition comprising a mixture of the base component and the catalyst package component in accordance with the two-part moisture curing composition of claim 1.

11. An article comprising a composition or a reaction product thereof, wherein the composition is the two-part moisture curing composition in accordance with claim 1.

12. The article in accordance with claim 11, wherein the composition or reaction product thereof is further defined as a material selected from the group consisting of coating materials, caulking materials, mold making materials, encapsulating materials, and combinations thereof.

13. The two-part moisture curing composition in accordance with claim 1, wherein the polydialkylsiloxane (i) is unreactive with the siloxane polymer (a).

14. The two-part moisture curing composition in accordance with claim 1, wherein the catalyst package further comprises from 1 to 20 wt. % of a colored filler or pigment based on the total weight of the catalyst package.

* * * * *